May 19, 1931. B. O. DAHL 1,806,148
SAFETY WING FOR AIRCRAFT
Filed July 13, 1925
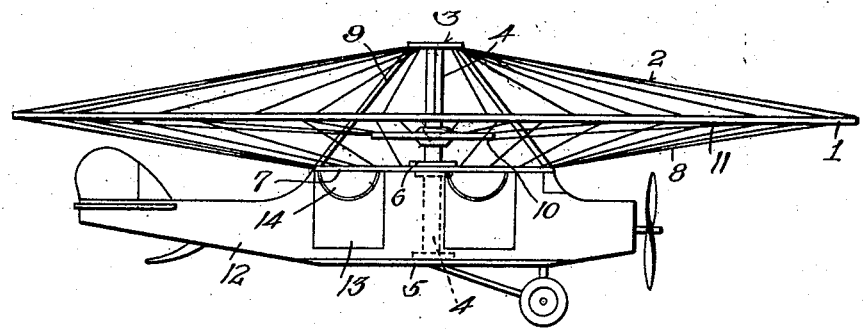
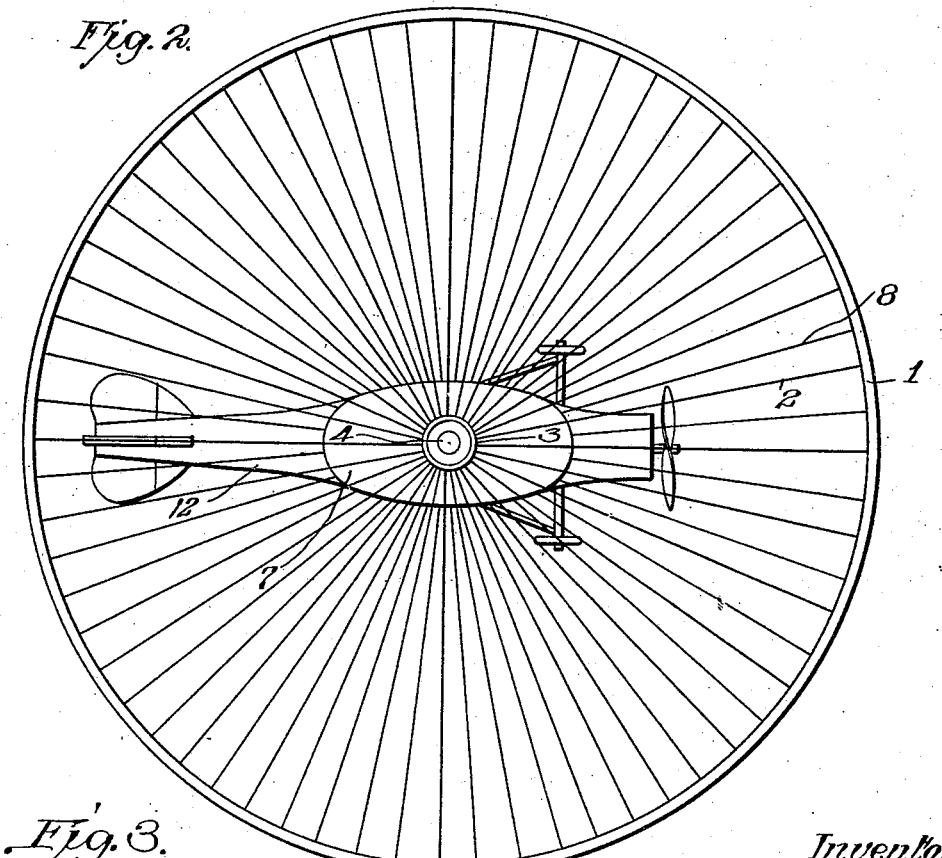
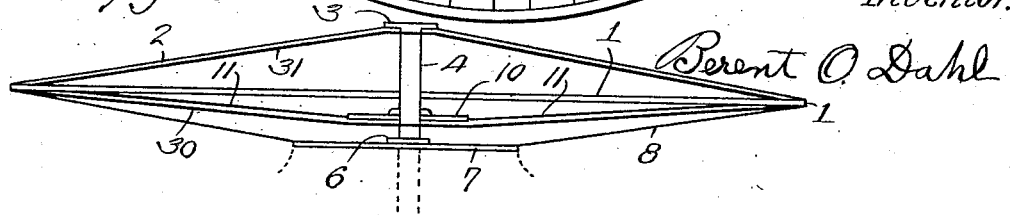
Inventor:
Berent O Dahl Patented May 19, 1931

1,806,148

UNITED STATES PATENT OFFICE

BERENT O. DAHL, OF VIROQUA, WISCONSIN

SAFETY WING FOR AIRCRAFT

Application filed July 13, 1925. Serial No. 43,380.

The present invention relates to safety wing for aircraft, which shall be so constructed as to be much more convenient and effective in safety than the wings constructed in ordinary manner, enabling a flying machine to come straight down and light easily in the same manner as parachutes.

Another object of the invention is to have a flying machine that is self-balancing and would be impossible to make a nose-dive or side-slide in case of emergency.

With those and other objects in view, which will appear as the nature of the invention is better understood, its frame consists essentially of a rim, hub, and spokes, together with two canvas or aluminum covers stretched tight from the rim along the under side of top and center spokes and fastened to flanges stationed on said hub, forming a large radius of wing spread and increased lifting power.

Another object of the invention is to make a heavier or lighter than air flying-machine in one construction. By injecting gas between the two covers it will be capable of lifting itself from the ground, thus having a heavier or lighter-than-air craft in one combination. As will be seen in the drawings, the round wide spread of the wing directly above the motor and occupants, provides a stability that would require no attention by the pilot to hold it in balance.

The further advantage is that the round wing will cut through the air much easier than the straight wing and release the air gradually, which will prevent the suction back of the wing and increase the speed.

With these objects in view the invention consists in the improved construction and arrangements of parts which will be hereafter fully described, and particularly pointed out in the claims.

In the accompanying drawings there has been shown a simple and preferred form of the invention, it being, however, understood that no limitation is necessarily made to the precise structural details therein exhibited, but that further changes and alterations, and modifications within the scope of the invention may be resorted to when desired.

In the drawings Fig. I is a perspective side elevation view of the frame for the safety-wing, showing it in combination with an ordinary fuselage for a flying-machine.

Fig. II is a perspective top view showing the full spread of the safety-wing in relation to the fuselage under the wing, being made on the same scale as shown in Fig. I.

Fig. III is a transverse sectional or fragmentary view of the same, showing the position of the two covers in dark or heavy lines indicated by numbers 30 and 31, running in parallel lines with the two sets of wire spokes 2 and 11, shown immediately above said covers.

Referring to the construction in details, the safety-wing consists of a rim 1 made out of aluminum or other light material, provided with upper spokes 2 stretched tight from rim 1 to flange 3, fastened on top of hub 4, said hub extending downwards to the bottom of car portion securely fastened at 5. The hub has another flange or shoulder 6, that sets against the metal flange 7, connecting the car portion to the wing. The wire spokes 8 are also stretched tight from rim 1 to flange 7, combining the car portion to the wing.

A third set of wire spokes 11 is provided, stretched from the rim 1 to flange 10, said flange being made to fit around the hub, and can be lowered or raised by sliding same up or down on the hub 4 by mechanical means, which will form a convex or concave shape under surface of the wing according to the requirements of the air currents.

A cover 31, shown in dark line in Fig. III, is fastened immediately under the top wire spokes 2, and stretched from the rim 1 to flange 3. The lower cover 30, shown in dark line, is also stretched from rim 1 to flange 10, immediately under the lower spokes 11, so that when the air-craft is in flight, the air presses the cover 30 against said wire spokes 11, which reenforces to a great extent the strengthening of said cover.

To lighten the weight of said safety-wing, helium or other gases can be injected between the two covers 30 and 31, making a lighter or heavier than air safety-wing in one combination.

Having thus described my invention, what I claim and desire to protect by Letters Patent is:

1. A safety-wing for air-crafts comprising a round rim, hub with flanges, three sets of wire spokes stretched between said rim and flanges, the center set of wire spokes being fastened to a flange fitting loose around said hub, and made to slide up or down on the hub, and stationed by mechanical means to adjust the under surface of said safety-wing, substantially as described.

2. In a safety-wing for air-crafts, three sets of wire spokes, a hub extending from top of wing to bottom portion of car, said hub being provided with flanges for connecting wire spokes and covers, the larger flange connecting the lower set of wire spokes and car to the wing, substantially as described.

3. In a safety-wing for air-crafts, a frame, comprising a rim, several sets of wire spokes, a hub with stationary flanges, and one loose flange fitting around the hub, said loose flange connected to center set of wire spokes, a flexible cover stretched on the under side of center spokes, which can be moved upward or downward by means of said loose flange, the center set of wire spokes and lower cover following the movement of the flange, forming a convex or concave shape under surface of the safety-wing, substantially as described.

4. In a safety-wing for air-crafts a frame comprising a rim with several sets of wire spokes, a hub with stationary flanges from which the spokes are stretched to the rim, a loose flange fitting around said hub, combined with center set of wire spokes to the rim. Two covers forming the thick wing for a gas chamber between said covers, into which gas can be injected to lighten the weight of said safety-wing substantially as described.

In testimony whereof I affix my signature.

BERENT O. DAHL.